United States Patent [19]

Marx

[11] Patent Number: 4,734,468

[45] Date of Patent: Mar. 29, 1988

[54] EPOXY RESIN COMPOSITION

[75] Inventor: Edward J. Marx, Houston, Tex.

[73] Assignee: Shell Oil Company, Houston, Tex.

[21] Appl. No.: 835,077

[22] Filed: Feb. 28, 1986

[51] Int. Cl.[4] ............................................. C08L 63/02
[52] U.S. Cl. ...................................... 525/524; 523/400
[58] Field of Search .......................... 525/524; 523/400

[56] References Cited

U.S. PATENT DOCUMENTS

| | | | |
|---|---|---|---|
| 3,321,438 | 5/1967 | Brooker et al. | 525/524 |
| 3,477,990 | 11/1969 | Dante et al. | 260/47 |
| 3,647,726 | 3/1972 | Ulmer | 525/524 |
| 3,882,064 | 5/1975 | Pregmon | 525/524 |
| 4,009,223 | 2/1977 | Noonan | 525/524 |
| 4,040,993 | 8/1977 | Elbling et al. | 525/524 |
| 4,075,260 | 2/1978 | Tsen et al. | 525/524 |
| 4,251,426 | 2/1981 | McClure et al. | 525/524 |
| 4,322,456 | 3/1982 | Martin | 427/195 |

*Primary Examiner*—Veronica P. Hoke

[57] ABSTRACT

A solid epoxy resin having a broad molecular weight distribution is prepared by melt or solution blending a major portion of a normally-solid epoxy resin having a weight per epoxide of about 1500 to about 10,000 and a minor portion of a normally-liquid epoxy resin having a weight per epoxide of from about 180 to about 340, and solidifying the resulting blend. A solvent-free powder coating composition is prepared by combining the blend with an effective amount of a curing agent and reducing the epoxy resin/curing agent to an average particle size less than about 60 mesh. The epoxy blend permits preparation of a powder coating formulation having improved grinding properties.

16 Claims, No Drawings

EPOXY RESIN COMPOSITION

BACKGROUND OF THE INVENTION

This invention relates to epoxy resin compositions. In one aspect, the invention relates to improving the properties, including flexibility and chemical stability, of epoxy coating formulations. In a specific aspect, it relates to methods of preparing epoxy resins having improved friability and processing characteristics for powder coating formulations.

Epoxy resins have achieved wide acceptance as coating materials for surfaces requiring a high degree of corrosion resistance. Epoxy resins for coating applications are available in both solid and liquid form, and a variety of methods are available to apply the resins to a surface to be coated. One common method is electrostatic deposition, in which a solid epoxy resin-based composition is applied to the surface as a finely-divided powder. For such an application method, it is desirable to have a solid epoxy resin which has good friability. "Good friability," in terms of epoxy powder coating compounding, includes a rapid rate of grinding and a narrow size distribution of the particles. Solid epoxy resins differ significantly in their grinding characteristics. Some resins which have excellent powder coating properties are difficult to grind into small particles. Taking the time to grind the particles adds expense to the process, while not insuring proper grinding compromises the quality of the coating. If the grinding properties of these solid epoxy resins could be improved, the results would be higher production rates during powder manufacture, better handling and application characteristics during powder deposition, and enhanced properties of the coating.

It is therefore an object of the present invention to provide a solid epoxy resin having improved grinding characteristics and enhanced powder coating properties. It is a further object to provide an economical means for producing a solid epoxy resin having a broad molecular weight distribution.

SUMMARY OF THE INVENTION

According to the invention, it has been found that a solid epoxy resin having a broad molecular weight distribution exhibits the excellent powder coating properties of high molecular weight resins as well as enhanced friability, which can be a problem with high molecular weight resins. A powder coating resin having these properties is prepared by a process comprising blending a major portion of a solid epoxy resin having a weight per epoxide within the range of about 1500 to about 10,000 and a liquid epoxy resin having a weight per epoxide within the range of about 180 to about 340 so as to produce a resin mixture having a molecular weight distribution (Q) greater than about 4 and allowing the blend to solidify. The blend is preferably made by adding the liquid epoxy resin to the reaction vessel during the latter stage of preparation of the solid epoxy resin by a catalytic fusion process. The solidified blend can then be cooled and flaked for use in powder coating formulations. A powder coating composition having improved flexibility can be prepared by processing the flaked epoxy resin with an effective amount of a solid curing agent and other appropriate ingredients to produce a solvent-free coating formulation. The resulting powder coating formulation can be applied to a surface to be coated by conventional means such as electrostatic deposition to provide a coating having excellent flexibility and chemical stability.

DETAILED DESCRIPTION OF THE INVENTION

The invention composition contains a major portion of a normally-solid, curable epoxy resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein n is zero or a number greater than 0, commonly in the range of 0 to 10.

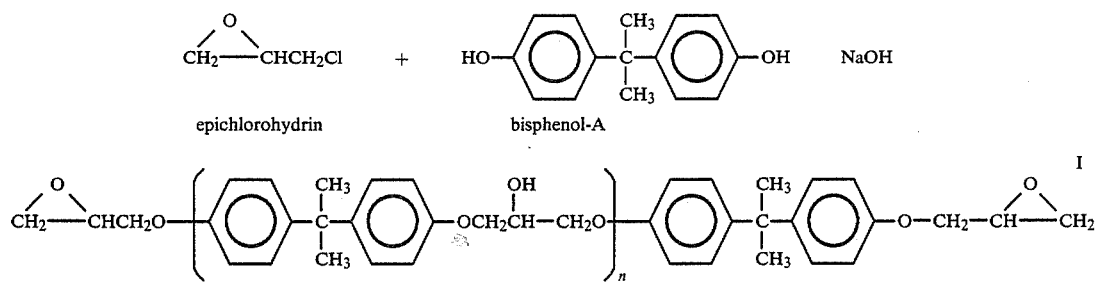

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

The preferred normally-solid epoxy resins for use in the invention compositions are the solid glycidyl polyethers of polyhydric phenols and polyhydric alcohols, particularly the glycidyl polyethers of 2,2-bis(4-hydroxyphenyl)propane having a number average molecular weight generally within the range of about 3000 to about 10,000 and an epoxide equivalent weight within the range of about 1500 and 10,000. Especially preferred are the diglycidyl polyethers of 2,2-bis(4-hydroxyphenyl)propane having a WPE within the range of about 1500 to about 4000 and a number average molecular weight within the range of from about 3000 to about 5000. Such epoxy resins are available commercially for Shell Chemical Company as EPON ® 1007F (a normally-solid epoxy resin having a softening point of about 115 C and a WPE of about 1700-2300) and EPON ® 1009F (a normally-solid epoxy resin having a softening point of about 130° C. and a WPE of about 2300-3700), for example.

The preferred normally-liquid (at 25° C.) epoxy resins for use in the invention compositions are the liquid glycidyl polyethers of polyhydric phenols and polyhydric alcohols, particularly the diglycidyl polyethers of 2,2-bis(4-hydroxyphenyl)propane having a number average molecular weight generally within the range of about 340 to about 600, preferably about 350 to about 400, and a WPE of from about 175 to about 350. Such normally-liquid epoxy resins are available commercially from Shell Chemical Company as EPON ® 828 and EPON ® 830, for example.

The normally-solid and normally-liquid epoxy components can be blended in any relative amounts which provide a blend having the desired properties, including viscosity in the molten state, molecular weight distribution and friability. The desired molecular weight distribution (Q) of the blend is greater than about 4, generally from about 4 to about 8. Generally, the normally-solid component will be the major component of the blend and will be present in an amount of from about 55 to about 97 weight percent, based on the weight of the epoxy blend, preferably about 75 to about 95 weight percent, most preferably about 80 to about 90 weight percent. The normally-liquid epoxy component will thus generally be the minor component of the blend and will constitute the remainder of the blend.

Blending of the normally-liquid and normally-solid epoxy components can be effected by any method effective to produce a final homogeneous blend which can be recovered as a solid having a broad molecular weight distribution, as compared with typical BPA-based solid epoxy resins. The preferred method is melt blending of the two components at a temperature greater than the softening point of the normally-solid epoxy. The preferred method for carrying out such blending has been found to be, because of the convenience of the method and the properties of the resulting blend, adding the normally-liquid epoxy to the normally-solid epoxy during the latter stages of preparation of the normally-solid epoxy while the normally-solid epoxy is at a temperature greater than its melting point.

An alternate method of blending the normally-solid and the normally-liquid epoxy resins is to mix a solution of the solid resin with the liquid resin and remove the solvent by, for example, distillation. This method would be preferred if a third component, such as an ultra high molecular weight epoxy resin having a number average molecular weight in the range of from about 45,000 to about 200,000, is desired as a component of the resin blend. Such ultra high molecular weight resins have good coating properties but, because of the high molecular weight and toughness of the materials, are difficult to process. Use of the ultra high molecular weight solid resins in combination with the above described normally-solid and normally-liquid resins permits exploitation of the properties imparted by the resins without the processing difficulties otherwise encountered.

When the ultra high molecular weight epoxy resins are used in blends with the normally-liquid resins, the ultra high molecular weight epoxy component and the normally-solid epoxy component, if present, would generally be present in a combined amount of from about 50 to about 97 weight percent, preferably about 60 to about 90 weight percent, based on the weight of the blend. The ultra high molecular weight epoxy can be added to the above-described blends in relatively minor amounts, e.g. about 1 to about 10 weight percent, to further increase the molecular weight distribution of the blend. Such ultra high molecular weight epoxy resins are available from Shell Chemical Company as EPONOL ® resins.

The blending of a normally-solid and a normally-liquid epoxy will generally be carried out in the melt in the reaction product mixture of the normally-solid epoxy as follows. First, the normally-solid epoxy resin is prepared by any means, such as in a conventional catalyzed reaction between a low molecular weight epoxy resin and a dihydroxy phenol. The low molecular weight starting material is conventionally prepared by the reaction of a polyhydric phenol with epichlorohydrin in the presence of a suitable catalyst and subsequent dehydrochlorination in an alkaline medium. The phenol can be, for example, bisphenol-A, and the resulting epoxy compound is the diglycidyl ether of bisphenol-A. The low molecular weight epoxy resin is then typically reacted with a dihydroxy phenol, such as bisphenol-A in the presence of a "fusion" catalyst to produce a solid epoxy resin having a molecular weight of from about 3000 to about 5000, or higher. The reaction may be conducted in the presence or absence of solvents or diluents, such as benzene, toluene, xylene, cyclohexane, and the like. Suitable fusion catalysts include onium salts such as tetraalkylammonium halides, the phosphonium halides and organic phosphines. Although the amount of fusion catalyst employed can vary, it will generally be present in the reaction mixture in an amount of from about 0.001 to about 10 weight percent, based on the weight of the reactants.

This reaction to prepare the normally-solid epoxy resin is known in the art and is disclosed in, for example, U.S. Pat. No. 3,477,990, the disclosure of which is hereby incorporated by reference.

The fusion reaction is allowed to continue to near completion, which will generally occur after about 1 to about 3 hours. The temperature of the reaction mixture at this point is generally about 180° C. if the reaction is being carried out in the melt. If the reaction is carried out in solvent, the reaction mixture is at a temperature dictated by the boiling point of the solvent. The present blends are prepared according to the preferred method by adding to the above-described high molecular weight fusion product the desired amount of a normally-liquid epoxy resin. The addition of the normally-liquid resin will generally be carried out in the fusion reaction vessel when the fusion product is at a temperature greater than its melting point, generally above about 120° C., preferably about 150° C. to about 200° C. The fusion reaction product and the normally-liquid epoxy are mixed by stirring or agitating the mixture for a time effective to produce a homogeneous product blend, generally at least about 30 minutes.

The resulting melt blend is recovered by filtration and cooling to a solid. The recovered solid epoxy blend is particularly useful in powder coating formulations because of the good coating properties typical of high molecular weight epoxies and the improved friability made possible by the blend. The invention thus provides solid epoxy resins having epoxy equivalent weights near those of conventional powder coating resins, relatively broad molecular weight distribution, and improved friability.

When used in powder coating applications, the epoxy blend will be used in combination with a curing agent and optional accelerator, usually a rapid-curing solid curing agent and appropriate accelerator. Suitable curing agents for use with the composition can include, for example, aliphatic amines such as 1,2-diaminocyclohexane, aromatic amines such as 2,4-bis(p-aminobenzyl)aniline and aromatic amine-epoxy adducts, anhydrides such as trimellitic anhydride, carboxyl functional polyesters, imidazoles such as 2-ethyl-4-methylimidazole, dicyandiamide, accelerated dicyandiamides, phenolic resins, acrylic resins, and aryl biguanides. The curing agent will be present in the composition in an amount effective to cure the epoxy resin, and this amount can vary widely depending upon the curing agent chosen and the resin blend to be cured. The curing agent will generally be present in an amount of about 1 to about 200 weight percent, based on the weight of the epoxy resin, preferably about 3 to about 20 weight percent.

The solid curing agent is mixed with the solid resin blend and the mixture is fed into an extruder or other suitable melt compounding equipment and mixed thoroughly under heat and shear to make a coating compound, which is then solidified by cooling and ground into fine particles for powder coating applications.

The composition can contain other material, including plasticizers, stabilizers, extenders, resins, tars, pigments, reinforcing agents, thixotropic agents, flow control agents, antioxidants, and other appropriate ingredients as known in the powder coating art.

The invention compositions are particularly suitable for coating applications, but are suitable for other applications, such as adhesives, reinforced composite structural parts and electrical laminates.

The following examples are provided to illustrate the preparation and properties of the invention epoxy resin blends.

EXAMPLE 1

A solid resin blend was prepared by melt-blending 89 weight percent of a normally-solid epoxy resin and 11 weight percent of a normally-liquid epoxy resin as follows.

1786 grams of a solid epoxy resin with an epoxide equivalent weight of 1660 was added to a 2 liter glass resin kettle. The kettle was fitted with a lid containing four openings for a stirrer, condenser, sparge tube and temperature indicator. An electric heating mantle surrounding the resin kettle was used to raise the temperature of the resin to 180° C. over a 1 hour period. 214 grams of EPON ® Resin 828 was then added to the molten solid resin and held with agitation for an additional hour at 180° C. The homogenous molten resin mixture was then poured into an aluminum pan to cool and solidify. The properties of this resin are compared to those of a standard powder coating resin, EPON ® Resin 2004, below:

TABLE 1

|  | EPON RESIN 2004 | EXAMPLE 1 |
| --- | --- | --- |
| Epoxide Equivalent Wt. (eew) | 912 | 891 |
| Molecular Wt. (GPC) |  |  |
| Mn | 1766 | 1707 |
| Mw | 4328 | 7178 |
| Mz | 9466 | 17548 |
| Q | 2.45 | 4.21 |

TABLE 1-continued

|  | EPON RESIN 2004 | EXAMPLE 1 |
| --- | --- | --- |
| Epoxy Functionality, Mn/eew | 1.94 | 1.92 |
| Particle Size Distribution- |  |  |
| Percent greater than 100 mesh | 14 | 5 |
| Percent less than 100 mesh | 86 | 95 |
| Mean Diameter-less than 100 mesh, Microns-Coulter Analysis | 55.8 | 52.8 |
| Solution Viscosity 40% Wt. in MEK, cP | 24.3 | 39.1 |
| Melt Viscosity ICI at 175° C., Poise | 21.1 | 48.0 |
| Glass Transition Point, °C. | 67.5 | 61.0 |
| Softening Point, Mettler, °C. | 99.5 | 102.8 |

The standard resin and the solid resin blend have approximately the same epoxy functionality, which is an important characteristic for chemical resistance of the cured coating. The solid resin blend, as can be seen from the particle size distribution and mean diameter data, exhibits superior friability. The invention blend also exhibits the desired combination of relatively high weight average molecular weight and relatively low glass transition temperature.

EXAMPLE 2

A solid resin blend was prepared by melt-blending the product of a catalyzed fusion reaction with a liquid epoxy in the final stages of the fusion reaction as follows.

A resin similar to Example 1 was prepared by first advancing liquid epoxy resin with bisphenol-A and a fusion catalyst to produce a solid resin similar to EPON ® Resin 1007F. Specifically, 1184 grams of a liquid resin with an epoxide equivalent weight of 187 was reacted with 602 grams of bisphenol-A, phenolic equivalent weight of 114, and 1 gram of ethyl triphenyl phosphonium iodide. The fusion reaction mixture was heated to 160° C. over a one hour period. An exotherm was observed and controlled to a 180° C. maximum. Additional heating for one hour at 180° C. produced a molten solid fusion product of approximately 1700 epoxide equivalent weight. To this molten fusion product was then added a normally-liquid epoxy resin and the resulting blend was recovered as described in Example 1. The blended material gave similar properties.

I claim:

1. A solid, solvent-free powder coating composition comprising (a) a product of blending from about 75 to about 95 weight percent, based on the weight of the epoxy blend, of a normally-solid epoxy resin having a weight per epoxide within the range of about 1500 to about 10,000, and from about 25 to about 5 weight percent of a normally-liquid epoxy resin having a weight per epoxide in the range of about 175 to about 350, and (b) an effective amount of a curing agent for the epoxy blend.

2. The composition of claim 1 in which the normally-solid epoxy resin is a glycidyl polyether of 2,2-bis(4-hydroxyphenyl)propane having a weight per epoxide of about 1500 to about 4000.

3. The composition of claim 2 in which the normally-liquid epoxy is a glycidyl polyether of 2,2-bis(4-hydroxyphenyl)propane having a weight per epoxide of about 175 to about 350.

4. The composition of claim 1 in which the epoxy blend has a molecular weight distribution within the range of from about 4 to about 8.

5. The composition of claim 2 in which the blend further comprises from about 2 to about 10 weight percent of an epoxy resin having a number average molecular weight of from about 45,000 to about 200,000.

6. The composition of claim 1 in which the normally-solid epoxy resin is a gycidyl polyether of 2,2-bis(4-hydrophenyl)propane having a weight per epoxide of from about 1700 to about 2300.

7. The composition of claim 5 in which the normally-liquid epoxy resin is a glycidyl polyether of 2,2-bis(4-hydroxyphenyl)propane having a weight per epoxide of from about 178 to about 182.

8. The composition of claim 1 in which the normally-solid epoxy resin is present in the epoxy blend in an amount of from about 85 to about 95 weigh percent, based on the weight of the epoxy blend, and the normally-liquid epoxy resin is present in the epoxy blend in an amount of from about 15 to about 5 weight percent.

9. The composition of claim 1 in which the epoxy blend has a molecular weight distribution of at least about 4.

10. The composition of claim 9 in the form of a powder having an average particle size less than about 60 mesh.

11. The composition of claim 10 in the form of a powder having an average particle size less than about 100 mesh.

12. A method for preparing a solid epoxy resin powder coating composition comprising the steps of:
(a) melt-blending from about 75 to about 95 weight percent, based on the weight of the epoxy components of the melt-blend, of a normally-solid epoxy resin which is a glycidyl polyether of 2,2-bis(4-hydroxyphenyl)propane having a weight per epoxide within the range of about 1500 to about 10,000, and a normally-liquid epoxy resin which is a polyglycidyl polyether of 2,2-bis(4-hydroxyphenyl)propane having a weight per epoxide within the range of about 175 to about 350; and
(b) cooling the resulting epoxy blend to a temperature below the melting point of the epoxy blend, thereby solidifying the epoxy blend;
(c) combining the solidified epoxy blend with an effective amount of a curing agent; and
(d) reducing the epoxy blend/curing agent to a powder having an average particle size less than about 60 mesh.

13. The method of claim 12 in which the normally-liquid epoxy resin is melt-blended in an amount effective to produce a solid epoxy resin blend having a molecular weight distribution greater than about 4.

14. The method of claim 13 in which the normally-liquid epoxy resin is melt-blended in an amount effective to produce a solid epoxy resin blend having a molecular weight distribution within the range of from about 4 to about 8.

15. The method of claim 13 in which the normally-solid epoxy resin is a product of a catalyzed fusion reaction of a liquid epoxy resin and 2,2-bis(4-hydroxyphenyl)propane and the blending is carried out in the fusion reaction vessel at a temperature higher than the melting point of the normally-solid epoxy resin.

16. The method of claim 13 in which the curing agent is selected from the group consisting of aliphatic amines, aromatic amines and dicyandiamide.

* * * * *